Feb. 8, 1927.
G. A. SCHACHT
1,617,031
SPRING HANGER FOR TRUCKS AND AUTOMOTIVE VEHICLES
Filed Aug. 10, 1923
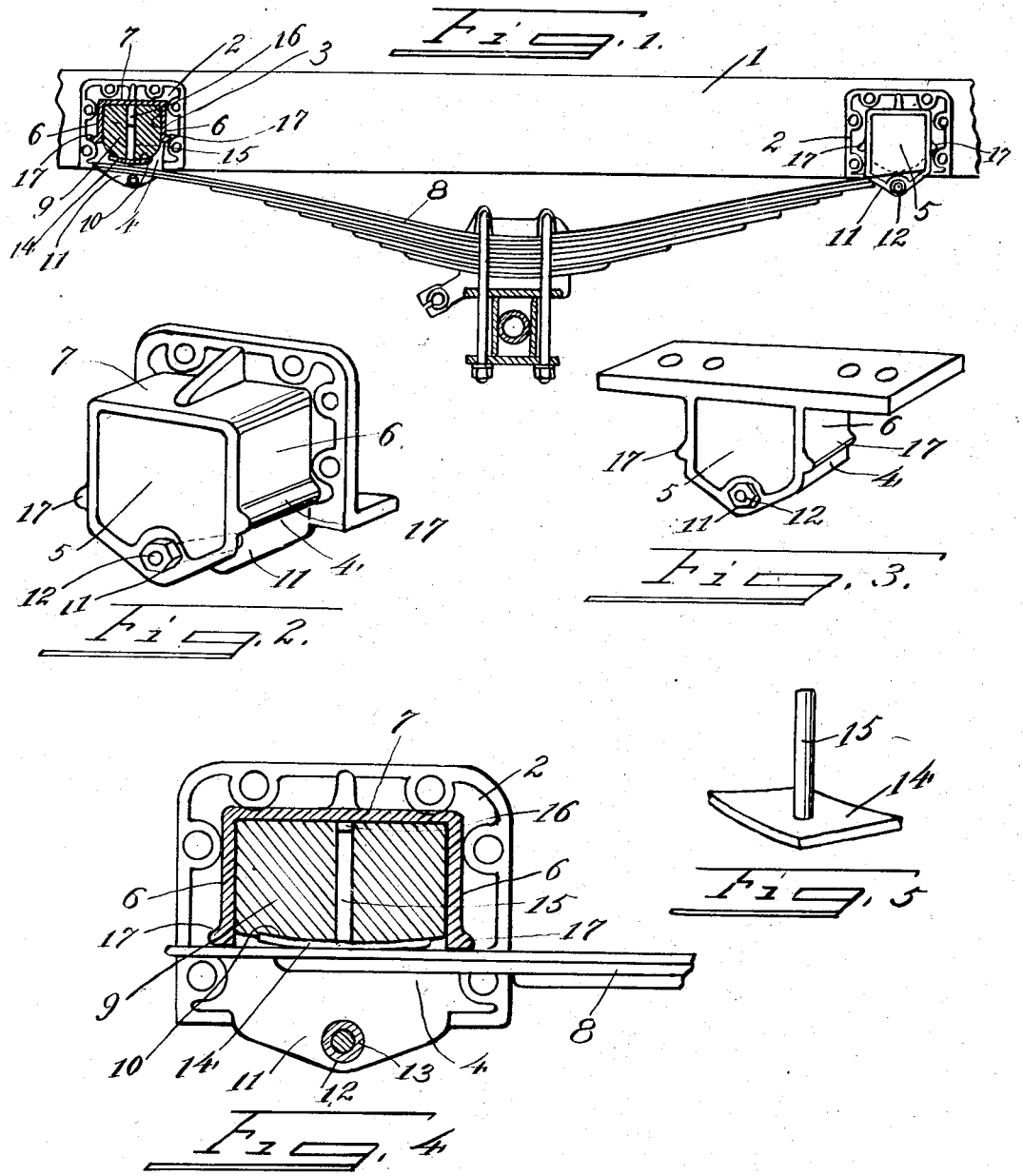
INVENTOR:
Gustave A. Schacht
BY Clement Allen
ATTORNEYS.

Patented Feb. 8, 1927.

1,617,031

UNITED STATES PATENT OFFICE.

GUSTAVE A. SCHACHT, OF CINCINNATI, OHIO.

SPRING HANGER FOR TRUCKS AND AUTOMOTIVE VEHICLES.

Application filed August 10, 1923. Serial No. 656.694.

My invention relates to a means for hanging vehicle springs to the chassis frame that will absorb a great amount of shock and vibration resulting from traveling over minor protuberances in the pavement or road surfacing, to reduce the amount of rumble and noise resulting from like causes and at the same time cheapen the cost of the springs and their replacement by eliminating the need for spring shackles, bolts, and the eyes in the top leaf of the spring. It is moreover my object to provide a simple and inexpensive device, that is reasonably free from excessive wear and the possibility of breakage.

It will be readily understood from the accompanying drawings and description, that the labor of replacement of springs and bearing parts is greatly simplified by the use of my invention over that of devices now in use.

In the drawings:

Figure 1 is a side elevation of a portion of the chassis frame of a vehicle, with a spring hung by means of my device, one hanger being in vertical section.

Figure 2 is a perspective view of one type of my device.

Figure 3 is a perspective view of a type adapted to the particular construction of certain vehicles.

Figure 4 is an enlarged sectional view of my device when under extreme load or after long periods of wear.

Figure 5 is a perspective view of a bearing plate provided between the spring and its resilient cushion.

Referring now to the drawings in detail, 1 represents a portion of a chassis frame. Riveted to the chassis frame is the hanger 2, having a box-like housing 3, with a rear wall 4, formed by the back plate of the hanger, a front wall 5, side walls 6 and an upper wall 7, leaving the under portion of the housing so formed, open for the free operation of the spring 8.

Within the housing 3 is contained a cushion 9, of resilient material, preferably rubber, of the size and shape to snugly fit in the housing 3. The portion 10 of the cushion 9, which forms the seat for the spring 8, is suitably rounded for practical reasons, and extends beyond the lower edges of the side walls 6. The front wall 5 and the rear wall 4 extend downward and the ears 11, thus formed, provide lateral guides for the leaves of the spring where it is inserted in the hanger. These ears have perforations opposite to each other to receive a bolt 12 and a bushing 13 thereon, the purpose for the bolt being to hold the spring 8 within the ears 11 when rebounding from great shock.

The cushion 9 may be perforated to increase its resilience when used on light vehicles.

A bearing plate 14 having a pin 15, extending through a vertical perforation 16 in the cushion 9, may be provided to protect the cushion against wear; however, its use is not imperative and may be dispensed with on light vehicles.

The side walls 6 have their lower edges reinforced by horizontal ridges 17, which form a bearing for the spring 8 when under excessive load or when the cushion 9 has been reduced by a long period of wear and has become inoperative for its intended purposes, in which case neglect of immediate replacement will not interfere with the operation of the vehicle.

It will be readily seen from the foregoing description, that in order to replace the spring or parts of it, the cushion or the bearing, is a simple matter of withdrawing the retaining bolt 12, raising the chassis by means of a jack until the spring sufficiently clears the guides 11, whereupon the worn or broken parts may be removed and replaced with new, the chassis lowered until the spring rests in its bearing and the retaining bolt returned into place.

Having thus described my invention, what I claim as new and desire to secure by Letters Patent, is:—

1. A vehicle spring hanger comprising a hanger mounted on the chassis of a vehicle, a housing supported by the hanger, a cushion member retained within the housing, the sides of the housing extended to laterally retain the end of a spring and the only longitudinal retaining means adapted to retain the spring within the housing provided by the downward thrust of the cushion member against a face of the spring, and the sides of the housing of such size as to be adapted to act as bearings against the face of the spring with extreme compression of the cushion member.

2. A vehicle spring hanger comprising a hanger mounted on the chassis of a vehicle, a housing supported by the hanger, a cushion member retained within the housing, the sides of the housing extended to laterally retain the end of a spring and the only longitudinal retaining means adapted to retain the spring within the housing provided by the downward thrust of the cushion member against a face of the spring, and the sides of the housing of such size as to be adapted to act as bearings against the face of the spring with extreme compression of the cushion member, and a bolt retained within the housing to limit the downward movement of the end of the spring.

GUSTAVE A. SCHACHT.